(12) United States Patent
Hashimoto et al.

(10) Patent No.: US 8,237,936 B2
(45) Date of Patent: Aug. 7, 2012

(54) DATA PROCESSING APPARATUS, DATA PROCESSING METHOD AND IMAGE FORMING APPARATUS

(75) Inventors: Masaya Hashimoto, Amagasaki (JP); Takeshi Morikawa, Takarazuka (JP); Daisuke Sakiyama, Maizuru (JP); Nobuo Kamei, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 997 days.

(21) Appl. No.: 10/622,462

(22) Filed: Jul. 21, 2003

(65) Prior Publication Data

US 2004/0190044 A1 Sep. 30, 2004

(30) Foreign Application Priority Data

Mar. 24, 2003 (JP) .................................. 2003-79848

(51) Int. Cl.
*G06F 3/012* (2006.01)
*G06K 15/00* (2006.01)
(52) U.S. Cl. .......... 358/1.13; 358/1.9; 358/2.1; 358/1.1; 358/1.16; 358/448
(58) Field of Classification Search .................. 345/619; 358/426.01, 2.1, 448, 1.12–1.18, 1.1; 382/234, 382/232, 239, 303, 304, 162, 166; 709/201; 712/28, 1; 341/51; 711/170, 168
See application file for complete search history.

(56) References Cited

U.S. PATENT DOCUMENTS

| | | | | |
|---|---|---|---|---|
| 5,317,416 A | * | 5/1994 | Tsuboi et al. | 358/444 |
| 5,463,476 A | | 10/1995 | Oya | |
| 5,574,834 A | * | 11/1996 | Horie et al. | 358/1.15 |
| 5,864,652 A | * | 1/1999 | Murahashi | 358/1.16 |
| 5,903,715 A | * | 5/1999 | Sawano | 358/1.15 |
| 5,920,685 A | * | 7/1999 | Romano et al. | 358/1.15 |
| 5,969,828 A | * | 10/1999 | Kawasaki et al. | 382/235 |
| 6,049,394 A | * | 4/2000 | Fukushima | 358/1.9 |
| 6,118,898 A | * | 9/2000 | Chen et al. | 382/232 |
| 6,285,458 B1 | * | 9/2001 | Yada | 358/1.15 |
| 6,381,031 B1 | * | 4/2002 | Mishima | 358/1.15 |

(Continued)

FOREIGN PATENT DOCUMENTS

JP 6-44013 2/1994

(Continued)

*Primary Examiner* — Twyler Haskins
*Assistant Examiner* — Chad Dickerson
(74) *Attorney, Agent, or Firm* — Buchanan Ingersoll & Rooney PC

(57) ABSTRACT

A data processing apparatus includes an input portion, an output portion, a plurality of compressing/expanding devices which compress data-to-be-outputted inputted from the input portion and expand compressed data-to-be-outputted, a file memory which stores the data-to-be-outputted compressed by some or all of the plurality of compressing/expanding devices, a data discrimination portion which discriminates whether the data-to-be-outputted inputted from the input portion is data including a small amount of information or a large amount of information, and a transfer controller. In cases where it is discriminated by the data discrimination portion that the data-to-be-outputted is data including a small amount of information, the transfer controller transfers the data-to-be-outputted to the output portion through the plurality of compressing/expanding devices operating in parallel. In cases where it is discriminated by the data discrimination portion that the data-to-be-outputted is data including a large amount of information, the transfer controller transfers the data-to-be-outputted to some or all of the plurality of compressing/expanding devices while transferring the data-to-be-outputted to the output portion.

6 Claims, 9 Drawing Sheets

U.S. PATENT DOCUMENTS

| | | | |
|---|---|---|---|
| 6,389,170 B1 * | 5/2002 | Kawasaki et al. | 382/232 |
| 6,504,622 B1 * | 1/2003 | Campbell et al. | 358/1.17 |
| 6,628,419 B1 * | 9/2003 | So et al. | 358/1.16 |
| 6,695,434 B2 * | 2/2004 | Konno et al. | 347/43 |
| 6,816,618 B1 * | 11/2004 | Imaizumi et al. | 382/239 |
| 6,819,445 B1 * | 11/2004 | Stevenson et al. | 358/1.15 |
| 7,324,228 B2 * | 1/2008 | Chiarabini et al. | 358/1.15 |
| 2001/0043747 A1 * | 11/2001 | Inuzuka et al. | 382/235 |
| 2002/0071138 A1 * | 6/2002 | Ohara | 358/1.15 |
| 2002/0091905 A1 * | 7/2002 | Geiger et al. | 711/170 |
| 2003/0122935 A1 * | 7/2003 | Shiohara | 348/207.2 |
| 2003/0198381 A1 * | 10/2003 | Tanaka et al. | 382/166 |
| 2004/0095605 A1 * | 5/2004 | Moro | 358/2.1 |

FOREIGN PATENT DOCUMENTS

| | | |
|---|---|---|
| JP | 6-284234 | 10/1994 |
| JP | 8-98034 | 4/1996 |
| JP | 9-219782 | 8/1997 |
| JP | 9-298652 | 11/1997 |
| JP | 11-41429 | 2/1999 |
| JP | 2000-318229 | 11/2000 |
| JP | 2003-69757 | 3/2003 |

* cited by examiner

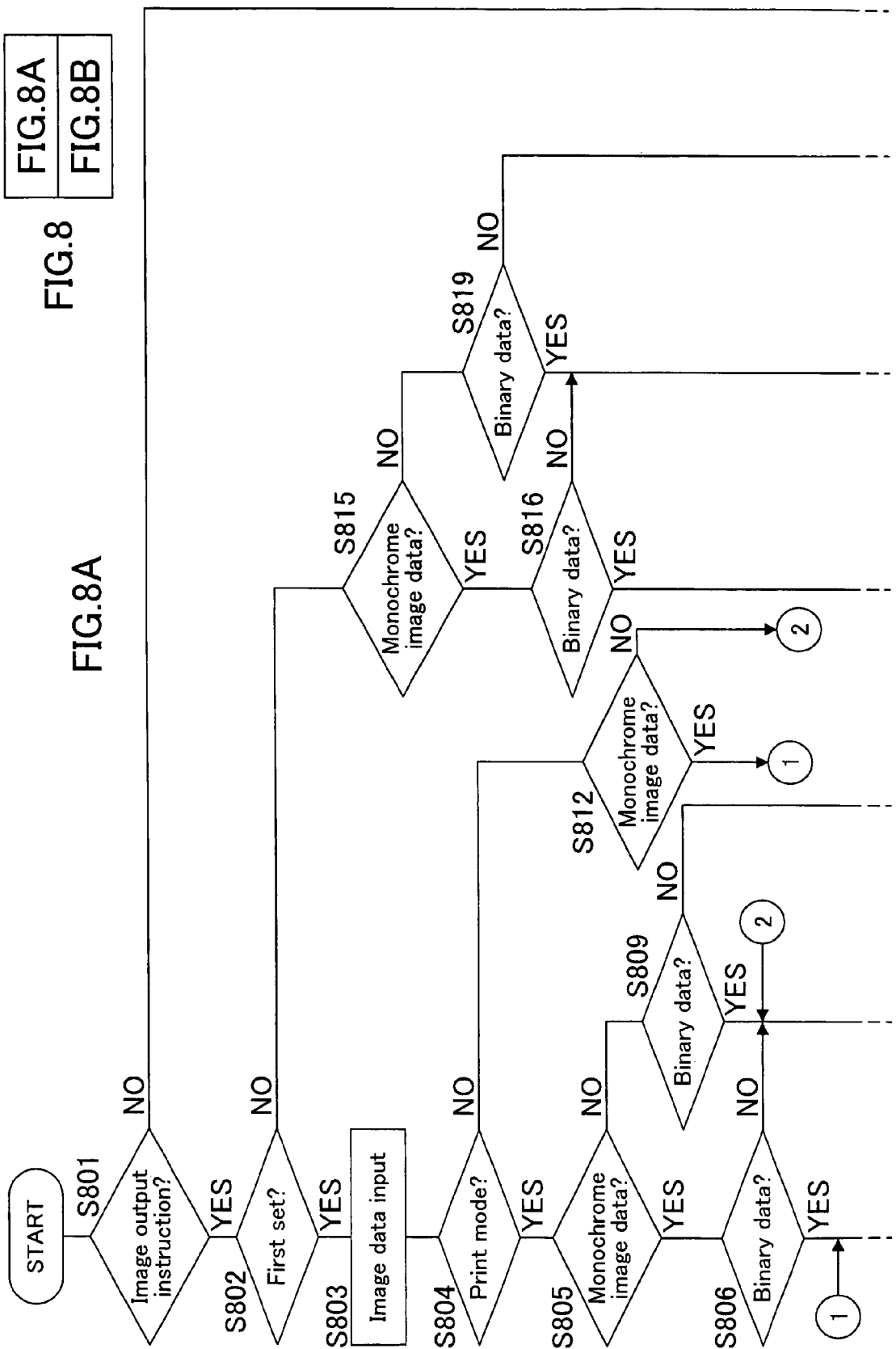

DATA PROCESSING APPARATUS, DATA PROCESSING METHOD AND IMAGE FORMING APPARATUS

Priority is claimed to Japanese Patent Application No. 2003-79848, filed on Mar. 24, 2003, the disclosure of which is incorporated by reference in its entirety.

BACKGROUND OF THE INVENTION

1. Field of the Invention

The present invention relates to a data processing apparatus, a data processing method and an image forming apparatus which can be used as a MFP (Multi Function Product) with multiple functions such as a copying function, a printer function, a scanner function and a facsimile function.

2. Description of Related Art

The following description sets forth the inventor's knowledge of related art and problems therein and should not be construed as an admission of knowledge in the prior art.

To realize the multiple functions, a MFP as mentioned above is equipped with a plurality of input portions such as a receiving portion for receiving print data sent from an external apparatus, such as a personal computer (hereinafter referred to as "PC"), via a network and/or an original reading portion for reading an original.

Further equipped are a printer portion for printing the image data read by the original reading portion or the print data from the external apparatus, a working memory for storing a data-to-be-outputted inputted from each input portions and a file memory for storing the once-inputted data for second and subsequent sets of outputting operations.

In order to minimize the storage capacity of the data to be stored in the file memory, in general, a plurality of compressing/expanding devices for compressing or expanding data are connected in parallel. The data spread on the working memory is transferred to the compressing/expanding devices to be compressed, and the compressed data is stored in the file memory.

In such a MFP, in cases where image data of an original read by the original reading portion is inputted, the inputted image data is spread on the working memory and the spread data is transferred to the printing portion for printing. Simultaneously, the data is transferred to the compressing/expanding devices to be compressed and then stored in the file memory. In cases where a second set of printing operation is executed, the compressed data stored in the file memory is expanded by the compressing/expanding devices and transferred to the working memory again. Then, the data is transferred to the print portion for executing the printing operation.

As mentioned above, however, in cases where image data from the original reading portion is transferred to the compressing/expanding devices to be compressed while being transferred to the printer portion, it is necessary to synchronize the image reading portion and the printer portion. As a result, it is difficult to drive the original reading portion at a rate faster than the operating speed of the printer portion, which deteriorates the entire processing ability of the apparatus.

It may be considered not to synchronize the original reading portion with the printer portion such that the image data from the original reading portion is transferred to the compressing/expanding devices to be compressed therein without being transferred to the printer portion and thereafter the compressed image data is expanded and then the expanded image data is transferred to the printer portion.

In this case, however, in cases where the image data is data including a large amount of information such as color image data, it takes a time to compress and expand the image data. Accordingly, the initiation of the printing operation will be delayed. As a result, there is a problem in processing performance as an entire apparatus.

U.S. Pat. No. 6,381,031 discloses a technique in which the assignment of the compression/expansion operation to be allotted to the compressing/expanding devices connected in parallel is changed depending on the quantity of the data-to-be-outputted. For example, the U.S. Patent discloses that, in cases where the code data is read out from the file memory while being thinned out or only the code data of even-numbered pages is read out, since the quantity of data to be stored in the file memory is greater than that of the image data to be read out, the number of the compressing/expanding devices for executing the compression operation increases and that for executing the expansion operation decreases. Furthermore, the U.S. Patent discloses that, in the case of a sort copy, all of the compressing/expanding devices are used to compress the data of the first original, half of them are used to compress and expand the data of the second and subsequent originals, and all of them are used to expand the compressed data after the completion of storing the data.

According to the technique disclosed in the aforementioned U.S. Patent, although it discloses an efficient operation of the compressing/expanding devices, it fails to disclose that the image reading portion is operated at a rate faster than the operation speed of the printer portion. Thus, it was not enough to solve the aforementioned problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It is an object of the present invention to provide a data processing apparatus capable of improving the processing performance as a whole by increasing the input operation rate for data-to-be-outputted having small amount of information and enabling an early output operation for data-to-be-outputted having a large amount of information.

It is another object of the present invention to provide a data processing method capable of improving the processing performance as a whole.

It is still another object of the present invention to provide an image forming apparatus capable of improving the processing performance as a whole.

According to the first aspect of the present invention, a data processing apparatus includes an input portion, an output portion, a plurality of compressing/expanding devices which compress data-to-be-outputted inputted from the input portion and expand compressed data-to-be-outputted, a file memory which stores the data-to-be-outputted compressed by some or all of the plurality of compressing/expanding devices, a data discrimination portion which discriminates whether the data-to-be-outputted inputted from the input portion is data including a small amount of information or a large amount of information, and a transfer controller. In cases where it is discriminated by the data discrimination portion that the data-to-be-outputted is data including a small amount of information, the transfer controller transfers the data-to-be-outputted to the output portion through the plurality of compressing/expanding devices operating in parallel. In cases where it is discriminated by the data discrimination portion that the data-to-be-outputted is data including a large amount of information, the transfer controller transfers the data-to-be-outputted to some or all of the plurality of compressing/expanding devices while transferring the data-to-be-outputted to the output portion.

In this data processing apparatus, in cases where the data-to-be-outputted is data including a small amount of information, the data-to-be-outputted will not be transferred to the output portion immediately, but will be transferred to the output portion through the compressing/expanding devices operating in parallel. Accordingly, the operating speed of the input portion does not depend on the operating speed of the output portion, which enables high speed data processing.

On the other hand, in cases where the data-to-be-outputted is data including a large amount of information, this data-to-be-outputted is transferred to compressing/expanding devices while being transferred to the output portion. Accordingly, in cases of data including a large amount of information, the output operation of the data can be initiated immediately after the input. As a result, the processing performance of the entire apparatus can be improved.

According to the second aspect of the present invention, a data processing method includes:

discriminating whether data-to-be-outputted is data including a small amount of information or a large amount of information;

executing compressing operation of the data-to-be-outputted and expanding operation of compressed data-to-be-outputted by a plurality of compressing/expanding devices operating in parallel and thereafter executing outputting operation of expanded data-to-be-outputted in cases where it is discriminated that the data-to-be-outputted is data including a small amount of information; and executing compressing operation of the data-to-be-outputted while executing outputting operation of the data-to-be-outputted in cases where it is discriminated that the data-to-be-outputted is data including a large amount of information.

In this data processing method, in cases where the data-to-be-outputted is data including a small amount of information, the data-to-be-outputted will not be transferred to the output portion immediately, but will be transferred to the output portion through the compressing/expanding devices operating in parallel. Accordingly, the operating speed of the input portion does not depend on the operating speed of the output portion, which enables high speed data processing.

On the other hand, in cases where the data-to-be-outputted is data including a large amount of information, this data-to-be-outputted is transferred to compressing/expanding devices while being transferred to the output portion. Accordingly, in cases of data including a large amount of information, the output operation of the data can be initiated immediately after the input. As a result, the processing performance of the entire apparatus can be improved.

According to the third aspect of the present invention, an image forming apparatus includes a scanner which outputs an original image by converting into electronic data with a photoelectric transferring element, an input port which receives a print job from an external device including a computer and a facsimile apparatus, an input adjusting portion which receives a scanned image job outputted from the scanner and a print job inputted into the input port, a plurality of compressing/expanding devices which compress data-to-be-outputted included in a job inputted from the input adjusting portion and expand compressed data-to-be-outputted, a storage which stores the compressed data-to-be-outputted, a printer which prints out data-to-be-outputted included in the print job or the scanned image job on a sheet, a data discrimination portion which discriminates whether the data-to-be-outputted is data including a small amount of information or a large amount of information, and a transfer controller. In cases where it is discriminated by the data discrimination portion that the data-to-be-outputted is data including a small amount of information, the transfer controller transfers the data-to-be-outputted to the printer through the plurality of compressing/expanding devices operating in parallel. In cases where it is discriminated by the data discrimination portion that the data-to-be-outputted is data including a large amount of information, the transfer controller transfers the data-to-be-outputted to some or all of the plurality of compressing/expanding devices while transferring the data-to-be-outputted to the output portion.

In this image forming apparatus, in cases where the data-to-be-outputted is data including a small amount of information, the data-to-be-outputted will not be transferred to the output portion immediately, but will be transferred to the printer portion through the compressing/expanding devices operating in parallel. Accordingly, the processing speed of the scanner or the input port does not depend on the processing speed of the printer, which enables high speed data processing.

On the other hand, in cases where the data-to-be-outputted is data including a large amount of information, this data-to-be-outputted is transferred to compressing/expanding devices while being transferred to the printer. Accordingly, in cases of data including a large amount of information, the printing operation of the data can be initiated immediately after the input. As a result, the processing performance of the entire apparatus can be improved.

Another objects and/or characteristics of the present invention will be apparent from the following explanations with reference to the attached drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
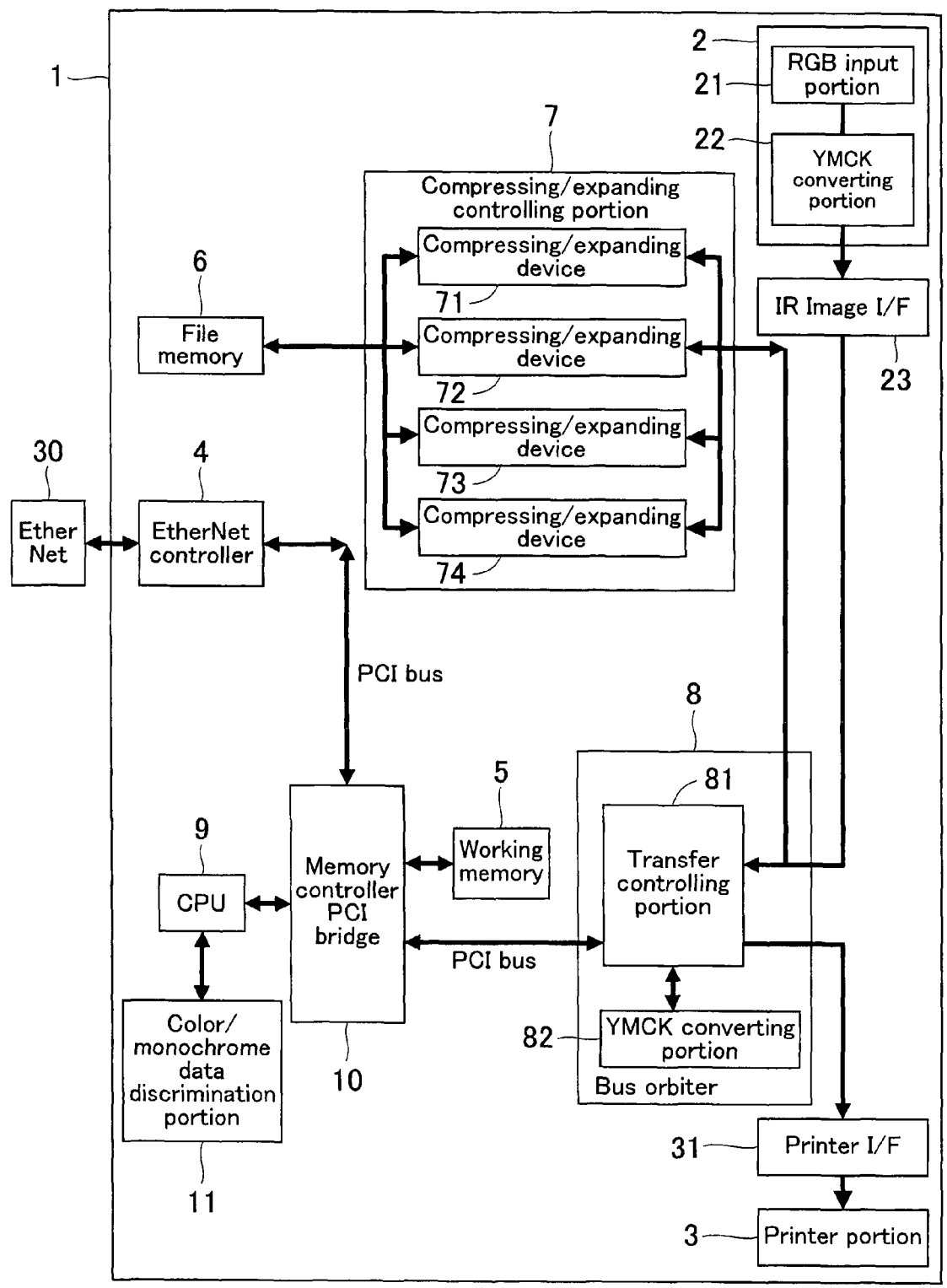
FIG. 1 is a block diagram showing the structure of the data processing apparatus according to an embodiment of the present invention.

FIG. 1 is a block diagram of a MFP 1 as a data processing apparatus according to an embodiment of the present invention.

This data processing apparatus is equipped with a plurality of input portions and a plurality of output portions. In detail, this apparatus is equipped with an original reading portion 2 as the input portion, a printer portion 3 as the output portion, an EtherNtet controller 4 which functions both as the input portion and the output portion.

The original reading portion 2 is equipped with an RGB input portion 21 as a scanner for reading an original and a YMCK converting portion 22 for converting each color of RGB into each color of YMCK when a color original is read. The image data read by the original reading portion 2 is transferred to a bus orbiter 8 via an image reader interface portion 23 (referred to as "IR image I/F" in FIG. 1).

The printer portion 3 prints out the image data transferred from the bus orbiter 8 on a paper or the like.

Furthermore, the EtherNet controller 4 functions as a transmitter/receiver for transmitting/receiving a print job via the EtherNet 30. For example, it receives a print job transmitted from an external device (not shown), such as a PC, via the EtherNet 30, or transmits the image data read by the original reading portion 2 to an external device via the EtherNet 30.

The MFP 1 is further equipped with a working memory 5, a file memory 6, a compressing/expanding controlling portion 7, the aforementioned bus orbiter 8, a CPU 9, a memory controller PCI bridge 10 and a color/monochrome data discrimination portion 11.

The working memory 5 is a memory which stores data-to-be-outputted, such as print data from an external device received by the EtherNet controller 4 and image data read by the original reading portion 2, and also stores another data.

In this embodiment, the compressing/expanding controlling portion 7 is equipped with a total of four compressing/expanding devices 71 to 74 which execute compressing/expanding operation of the data-to-be-outputted. In this embodiment, as will be explained later, the compressing/expanding controlling portion 7 changes the operation assignment of the four compressing/expanding devices 71 to 74 depending on the discrimination result by the color/monochrome data discrimination portion 11 regarding whether the inputted data-to-be-outputted is color data or monochrome data. In detail, in cases where the data-to-be-outputted is color data including a large amount of information, the compressing/expanding controlling portion 7 assigns all of the four compressing/expanding devices 71 to 74 to compressing operation at the time of compressing the data and to expanding operation at the time of expanding the data. On the other hand, in cases where the data-to-be-outputted is monochrome data including a small amount of information, the compressing/expanding controlling portion 7 assigns some of the four compressing/expanding devices 71 to 74 to compressing operation and some or all of the other compressing/expanding devices 71 to 74 to expanding operation.

The file memory 6 stores the data-to-be-outputted compressed by the compressing/expanding devices 71 to 74.

The bus orbiter 8 transfers the data-to-be-outputted to each portion of the MFP in accordance with the instructions of the transfer controlling portion 81. Furthermore, the bus orbiter 8 is provided with a YMCK converting portion 82. This YMCK converting portion 82 converts each color of RGB into each color of YMCK in cases where the print data as data-to-be-outputted inputted from outside via the EtherNet 30 is RGB color data.

The memory controller PCI bridge 10 controls the working memory 5 and connects the bus for the CPU 9 and the PCI bus.

The CPU 9 totally controls the entire MFP 1 including the memory controller PCI bridge 10, the transfer controlling portion 81 and the compressing/expanding controlling portion 7. In addition to the above, the CPU 9 further discriminates various matters. For example, the CPU discriminates whether the outputting operation of the data is a first set of outputting operation or second or subsequent set of outputting operation.

The color/monochrome data discrimination portion 11 discriminates whether the data-to-be-outputted transmitted from the original reading portion 2 or the external apparatus is data including a large amount of information or a small amount of information when the data is stored in the working memory. The aforementioned "amount of information" denotes an amount of information to be processed (to be inputted) per unit time or an amount of information included per unit size. Concretely, in this embodiment, the color/monochrome data discrimination portion 11 discriminates whether the data-to-be-outputted is color data including a large amount of information or monochrome data including a small amount of information. Then, the discrimination result is notified to the compressing/expanding controlling portion 7 via the CPU 9.

Next, the operation of the MFP 1 shown in FIG. 1 will be explained with reference to the flowchart shown in FIG. 2. In the following explanation and the drawings, "Step" will be abbreviated as "S."

The following explanation will be directed to the case in which data-to-be-outputted is image data of the original read by the original reading portion 2 and the image data is outputted from the printer portion 3.

At S201, the CPU 9 of the MFP 1 discriminates whether an instruction for outputting image data is made. If the instruction is made (Yes at S201), at S202, it is discriminated whether the outputting operation is a first set of outputting operation. If no instruction is made (No at S201), the routine stays as it is.

At S202, if it is the first set of outputting operation (Yes at S202), at S203, the RGB input portion 21 of the original reading portion 2 reads the original. The read image data is color-converted by the YMCK converting portion 22 and thereafter transferred to the working memory 5 by the transfer controlling portion 81 and stored in the working memory 5. Then, at S204, the color/monochrome data discrimination portion 11 discriminates whether the stored image data is color data or monochrome data, and the discrimination result is notified to the compressing/expanding controlling portion 7.

If the image data is monochrome data (Yes at S204), at S205, the compressing/expanding controlling portion 7 assigns two compressing/expanding devices 71 and 72 to compressing operation and the remaining two compressing/ expanding devices 73 and 74 to expanding operation among four compressing/expanding devices 71 to 74. Subsequently, at S206, the transfer controlling portion 81 transfers the monochrome data divided in the sub-scanning direction from the working memory 5 to the compressing/expanding devices 71 and 72 in turn to be compressed and then to the file memory 6 to be stored for the second set of printing operation. Further, the transfer controlling portion 81 transfers the data read out from the file memory 6 to the compressing/expanding devices 73 and 74 to be expanded. In short, compressing operation and expanding operation are executed in parallel. The expanded data is transferred to the printer portion 3 via the working memory 5 and then printed by the printer portion 3. Then, the routine returns to S201. the aforementioned operations are repeated by the number of pages transmitted from the image reading portion 2.

At S204, if the image data is not monochrome data, i.e., the image data is color data (No at S204), at S207, the compressing/expanding controlling portion 7 assigns all of the four compressing/expanding devices 71 to 74 to compressing operation.

Subsequently, at S208, the transfer controlling portion 81 transfers the color data from the working memory 5 to the compressing/expanding devices 71 to 74 every block divided in the sub-scanning direction and simultaneously transfers the same to the printer portion 3. Thus, color image data is printed and compressed. The compressed image data is stored in the file memory 6 for the second set of printing operation. The aforementioned operation is repeated by the number of pages.

At S202, if the printing operation is not the first set of printing operation (No at S202), at S209, it is discriminated whether the image data is monochrome data. If it is not monochrome data (No at S209), at S210, the compressing/expanding controlling portion 7 assigns all of the four compressing/expanding devices 71 to 74 to expanding operation. At S211, the transfer controlling portion 81 transfers the data expanded by the assigned four compressing/expanding devices 71 to 74 to the printer portion 3. The transferred data is printed by the printer portion 3. This operation is repeated by the number of pages.

On the other hand, at S209, if the image data is monochrome data (Yes at S209), at S212, the compressing/expanding controlling portion 7 sets the same assignment of compressing/expending operation of the compressing/expanding devices 71 to 74 as that of the first set of printing operation. Subsequently, at S213, the transfer controlling portion 81 transfers the data expanded by the two compressing/expanding devices to the printer portion 3. The transferred data is printed by the printer portion 3. This operation is repeated by the number of all pages.

Figure 3:
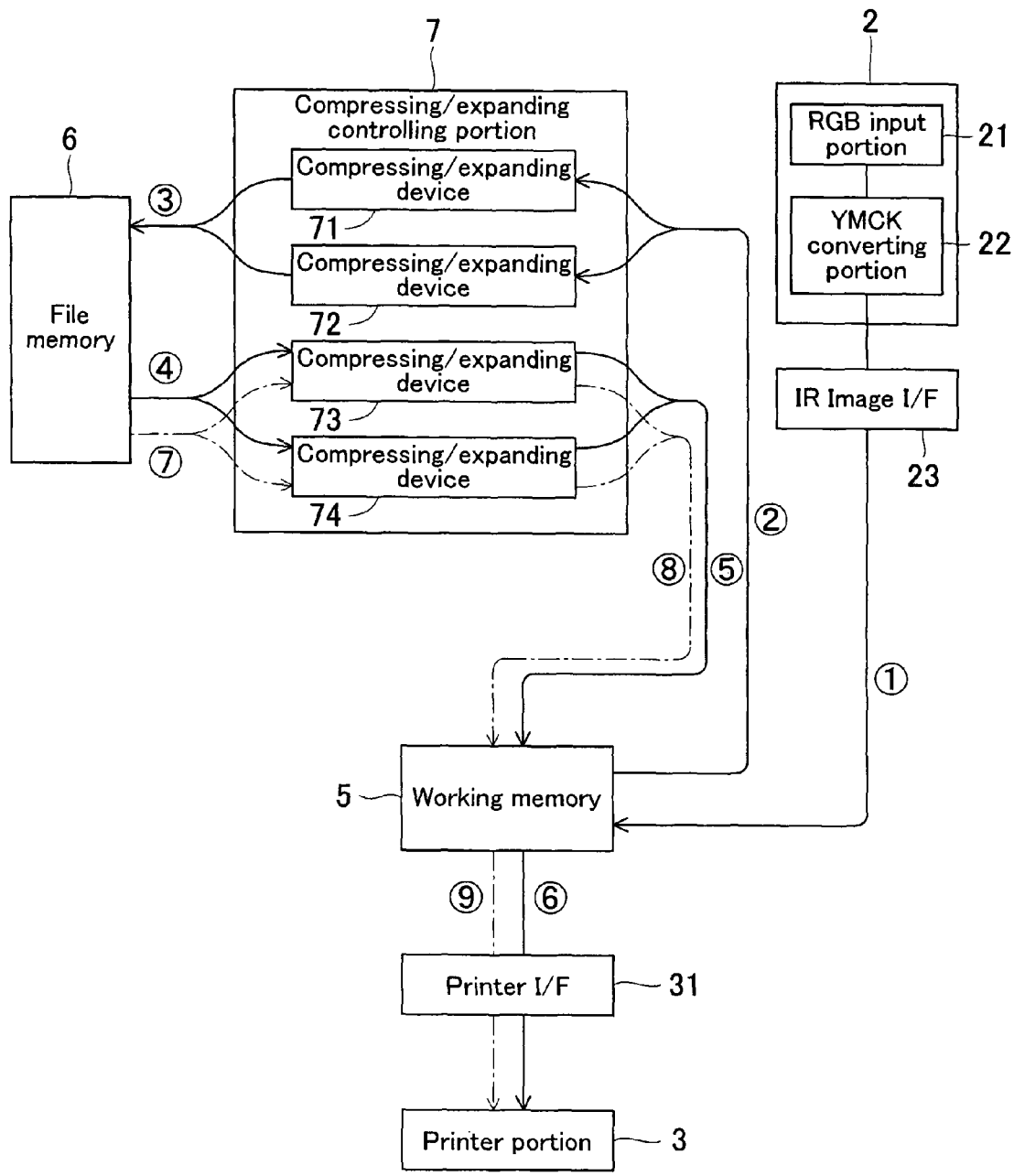
FIG. 3 is an explanatory view showing the data transferring route when the data-to-be-outputted read by the original reading portion is monochrome data in the data processing apparatus shown in FIG. 1.

The aforementioned monochrome data transfer paths are shown in FIG. 3. In FIG. 3, for easy understanding, only the necessary portions of the MFP1 are illustrated, and bus lines connecting each portion are omitted and the data transfer routes are shown with arrows.

As will be understood from FIG. 3, the monochrome data transmitted from the original reading portion 2 is transferred to the working memory 5 (see arrow ①), subsequently from the working memory 5 to the compressing/expanding devices 71 and 72 assigned to compressing operation (see arrow ②), then to file memory (see arrow ③).

Furthermore, the monochrome data is transferred from the file memory 6 to the compressing/expanding devices 73 and 74 assigned to compressing operation (see arrow ④), then to the working memory 5 (see arrow ⑤), then from the working memory 5 to the printer portion 3 (see arrow ⑥).

In this transfer route, since the compressing operation by the compressing/expanding devices 71 and 72 and the expanding operation by the compressing/expanding devices 73 and 74 are not required to be synchronized, the reading operation speed of the original reading portion 2 can be arbitrary set irrespective of the operation speed of the printer portion 3. As a result, the reading operation speed of the original reading portion 2 can be maximized. Furthermore, since monochrome data includes a small amount of information, even if the data is transferred to the printer portion 3 via the compressing/expressing devices operating in parallel, the time for waiting for the initiation of the printing operation does not increase.

If the printing operation is the second or subsequent set of printing operation, the data read out from the file memory 6 is transferred to the two compressing/expanding devices 73 and 74 assigned to expanding operation (see arrow ⑦), subsequently to the working memory 5 (see arrow ⑧) and then to the printer portion 3 (see arrow ⑨).

Figure 4:
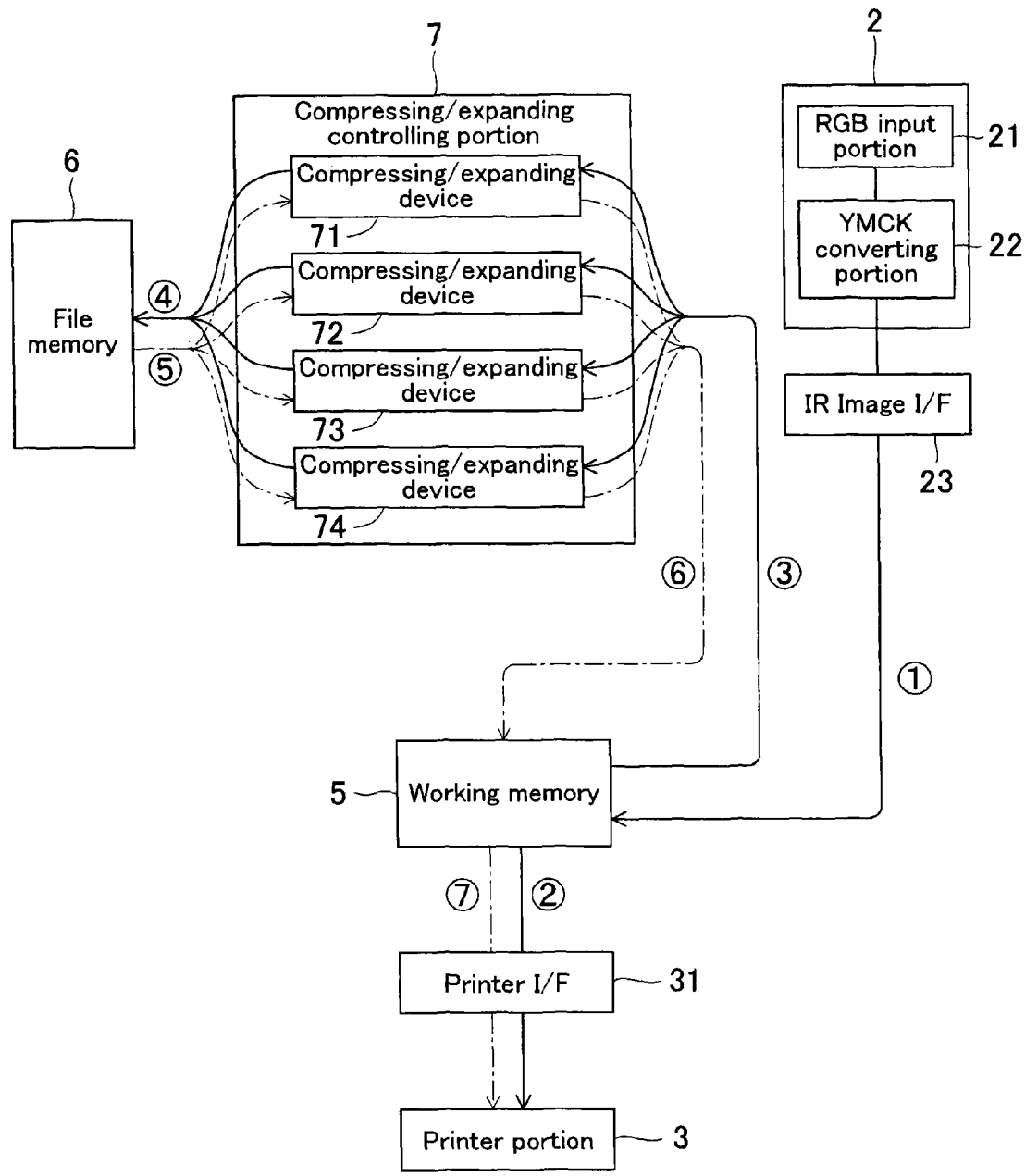
FIG. 4 is an explanatory view showing the data transferring route when the data-to-be-outputted read by the original reading portion is color data in the data processing apparatus shown in FIG. 1.

FIG. 4 shows color data transfer paths. In FIG. 4, for easy understanding, only the necessary portions of the MFP1 are illustrated, and bus lines connecting each portion are omitted and the data transfer routes are shown with arrows.

As will be understood from FIG. 4, the color data transmitted from the original reading portion 2 is transferred to the working memory 5 (see arrow ①), subsequently to the compressing/expanding devices 71 to 74 (see arrow ③) and then to the file memory (see arrow ④) while being transferred from the working memory 5 to the printer portion 3 (see arrow ②).

In this transfer route, the color data including a large amount of information is compressed by all of the compressing/expanding devices 71 to 74 at their maximum capacity, resulting in high speed processing. Furthermore, the color data is printed by the printer portion 3 without delay. In the meantime, if the color data is processed via the monochrome data transferring route, it takes a long time for the compressing/expanding operation since the data include a large amount of information, resulting in an increased initiation waiting time for the printing operation. However, in this transfer route, the printing operation is executed without delay, the time for waiting for the initiation of the printing operation can be omitted.

If the printing operation is the second or subsequent set of printing operation, the data read out from the file memory 6 is transferred to all of the four compressing/expanding devices 71 to 74 assigned to expanding operation (see arrow ⑤), subsequently to the working memory 5 (see arrow ⑥) and then to the printer portion 3 (see arrow ⑦).

The following explanation will be directed to the base in which data-to-be-outputted is print data transmitted from outside.

Figure 2:
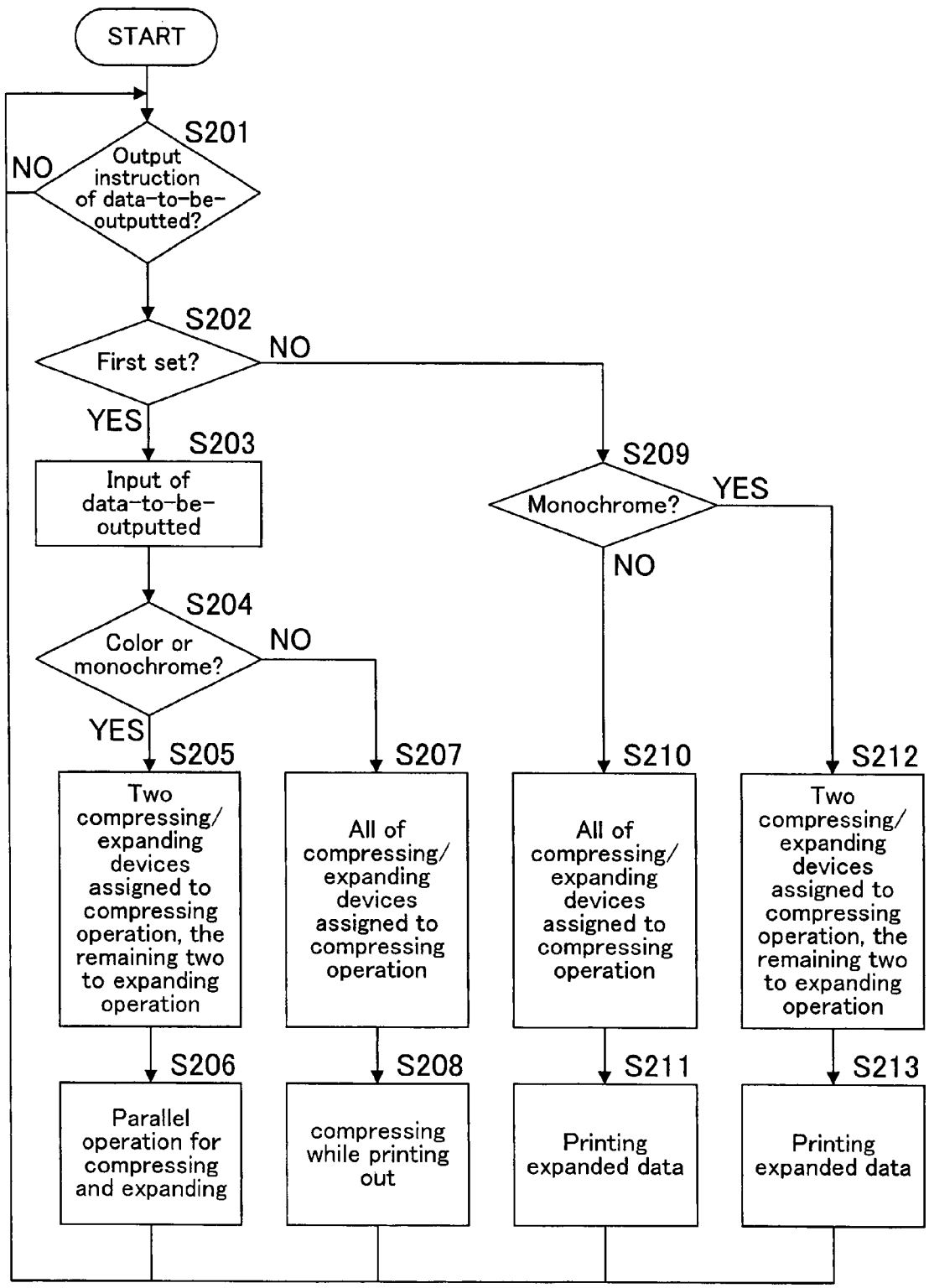
FIG. 2 is a flowchart showing the operation of the data processing apparatus shown in FIG. 1.

In this case, since the processing procedure is similar to the procedure shown by the flowchart in FIG. 2, the explanation will be omitted.

Figure 5:
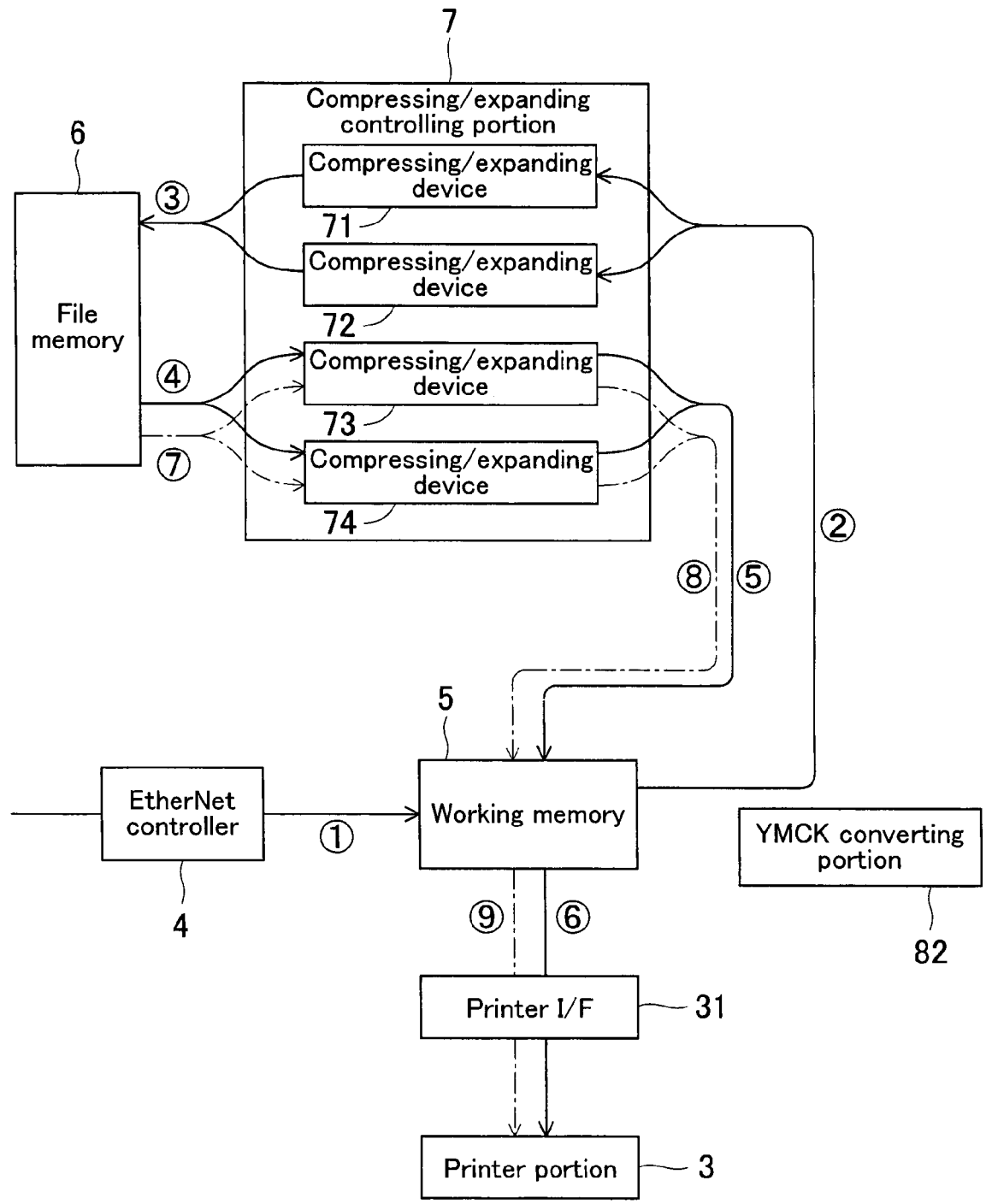
FIG. 5 is an explanatory view showing the data transferring route when the data-to-be-outputted inputted from outside is monochrome data in the data processing apparatus shown in FIG. 1.

FIG. 5 shows the transfer paths in cases where print data is monochrome data. In FIG. 5, for easy understanding, only the necessary portions of the MFP1 are illustrated, and bus lines connecting each portion are omitted and the data transfer routes are shown with arrows.

As will be understood from FIG. 5, the monochrome data transmitted from the EtherNet controller 4 is transferred to the working memory 5 (see arrow ①) to be RIP-developed, subsequently to the compressing/expanding devices 71 and 72 (see arrow ②) and then to the file memory (see arrow ③).

Furthermore, the data is transferred to the working memory 5 (see arrow ⑤) through the compressing/expanding devices 73 and 74 assigned to expanding operation (see arrow ④)), then from the working memory 5 the to the printer portion 3 (see arrow ⑥)).

In this transfer route, since the compressing operation by the compressing/expanding devices 71 and 72 is not required to be synchronized with the expanding operation by the compressing/expanding devices 73 and 74, the input operation speed of the EtherNet controller 4 can be arbitrary set irrespective of the operation speed of the printer portion 3. For example, in cases where the data length of the print data is long (large capacity), the EtherNet controller 4 delays the input of data which cannot be developed in the working memory 5. However, the input operation speed of the EtherNet controller 4 can be arbitrary set irrespective of the operation speed of the printer portion 3. Therefore, the open time of the working memory 5 becomes short, enabling a high speed input. Furthermore, since the monochrome data includes a small amount of information, even if it is transferred to the printer portion 3 via compressing/expanding operations, the time for waiting for the initiation of printing operation does not increase.

If the printing operation is the second or subsequent set of printing operation, the data read out from the file memory 6 is transferred to the compressing/expanding devices 73 and 74 assigned to expanding operation (see arrow ⑦), subsequently to the working memory 5 (see arrow ⑧) and then to the printer portion 3 (see arrow ⑨).

Figure 6:
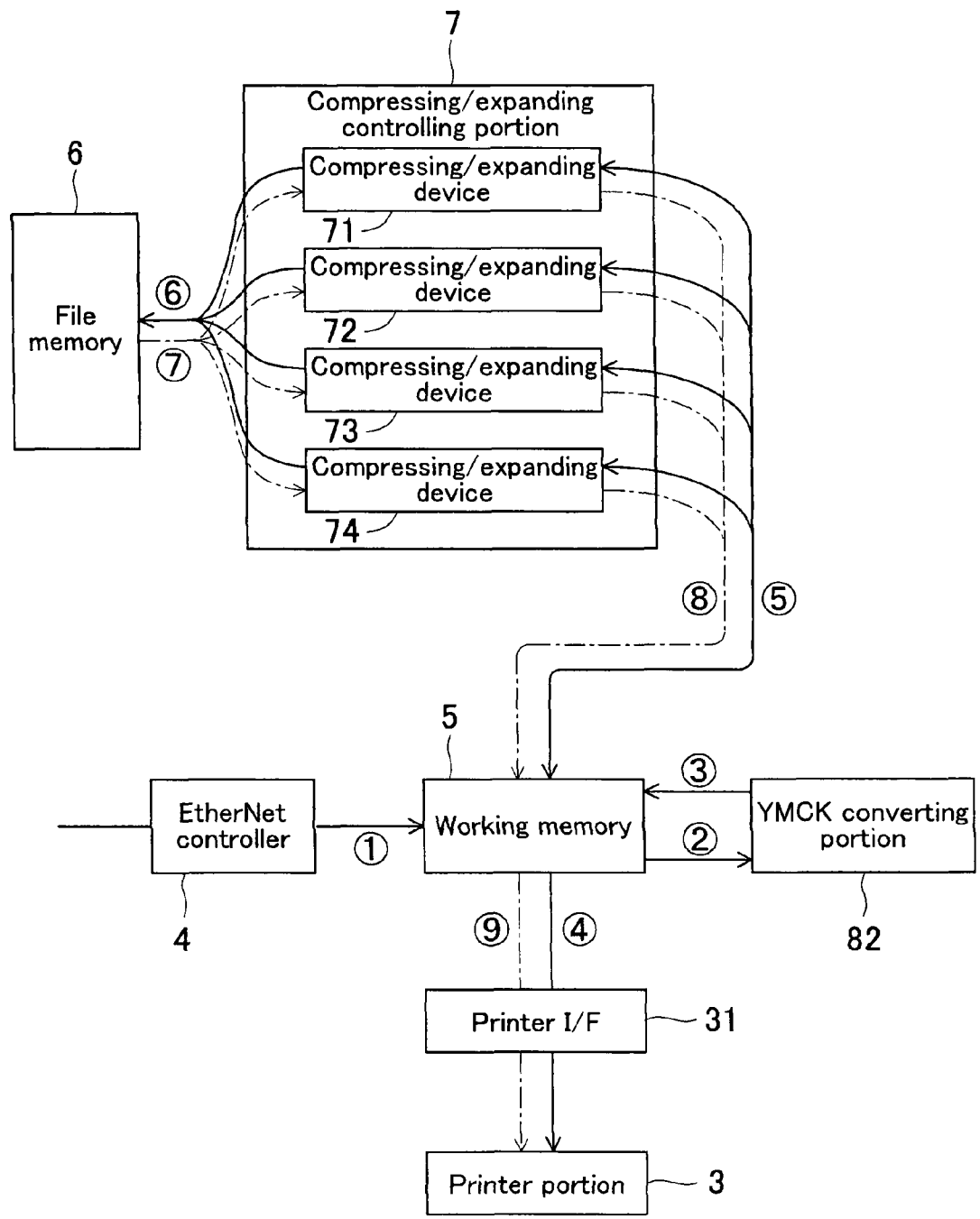
FIG. 6 is an explanatory view showing the data transferring route when the data-to-be-outputted inputted from outside is color data in the data processing apparatus shown in FIG. 1.

FIG. 6 shows the transfer paths in cases where print data is color data. In FIG. 6, for easy understanding, only the necessary portions of the MFP1 are illustrated, and bus lines connecting each portion are omitted and the data transfer routes are shown with arrows.

As will be understood from FIG. 6, the RGB color data transmitted from the EtherNet controller 4 is transferred to the working memory 5 (see arrow ①) to be RIP-developed, subsequently to the YMCK converting portion 82 to be color-converted (see arrow ②), then transferred to the working memory (see arrow ③).

Subsequently, the data is transferred to all of the compressing/expanding devices 71 to 74 assigned to compressing operation (see arrow ⑤) and then to the file memory 6 (see arrow ⑥) while being transferred to the print portion 3 (see arrow ④).

In this transfer route, the color data including a large amount of information is compressed by all of the compressing/expanding devices 71 to 74 at their maximum capacity, resulting in high speed processing. Furthermore, the color data is printed by the printer portion 3 without delay.

If the printing operation is the second or subsequent set of printing operation, the data read out from the file memory 6 is transferred to all of the four compressing/expanding devices 71 to 74 assigned to expanding operation (see arrow ⑦), subsequently to the working memory 5 (see arrow ⑧) and then to the printer portion 3 (see arrow ⑨).

Next, another embodiment of the present invention will be explained.

Figure 7:
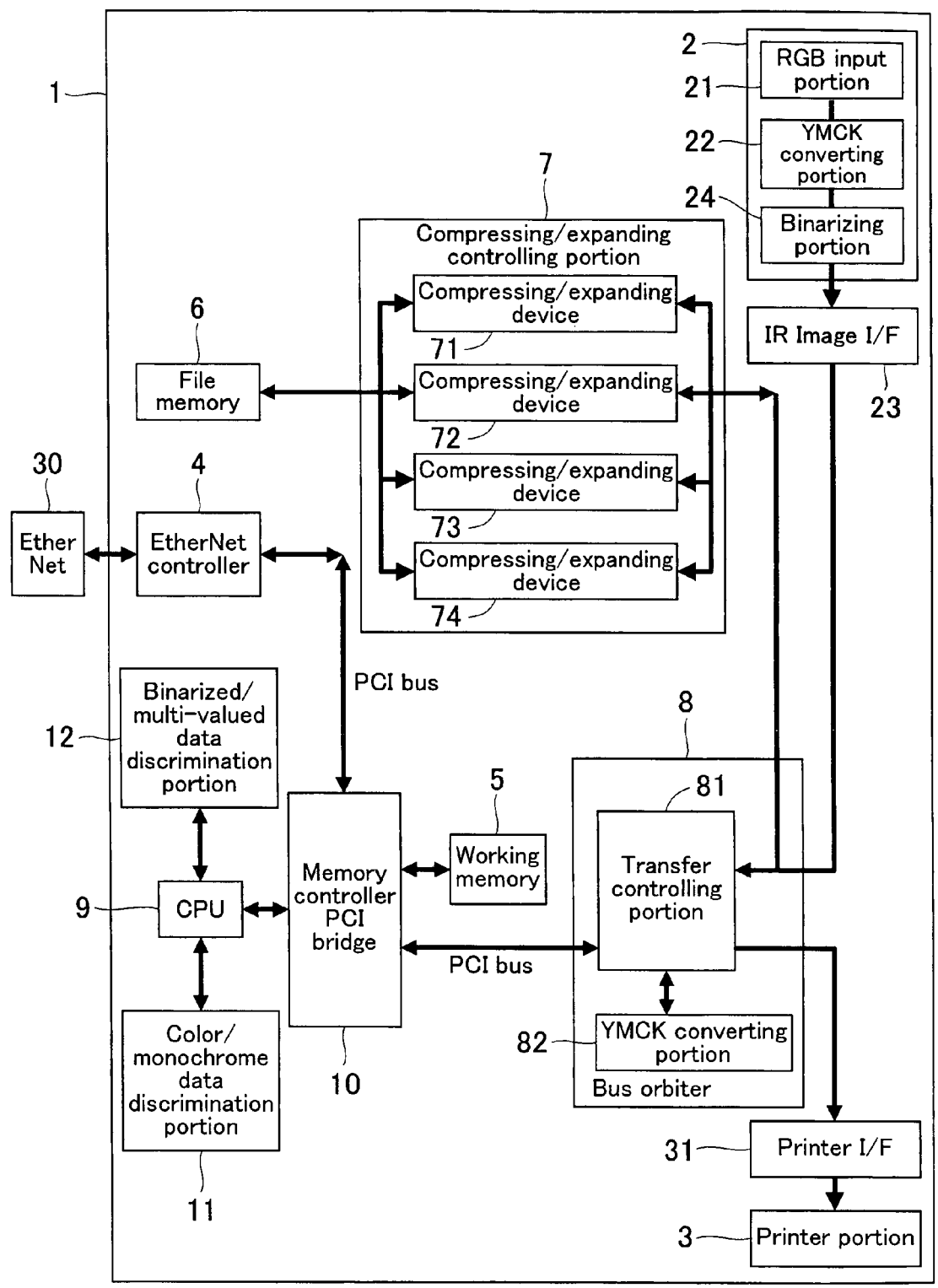
FIG. 7 is a block diagram showing the structure of the data processing apparatus according to another embodiment of the present invention.

FIG. 7 is a block diagram of the MFP 1. In this embodiment, the original reading portion 2 is provided with a binarizing portion 24 which binarizes the image data color-converted by the YMCK converting portion 22, and the binarized image data is transferred to the working memory 5.

In order to discriminate whether an amount of information of the data-to-be-outputted, i.e., an amount of information to be processed (inputted) per unit time or an amount of information included per unit size, is large or small, the MFP1 is provided with a binary/multi-valued data discrimination portion 12 which discriminates whether the data-to-be-outputted is binarized data (binary data) or non-binarized data (multi-valued data). In the case of binary data, it is discriminated that the data is data including a small amount of information. To the contrary, in the case of multi-valued data, it is discriminated that the data is data including a large amount of information.

Since the other structures of the MFP1 are the same as those of the MFP1 of the embodiment illustrated in FIG. 1, the same reference numerals are allotted to the corresponding portions and the explanation will be omitted.

Next, the processing procedures in cases where it is not apparent whether the original image data read by the original reading portion 2 is binarized will be explained with reference to the flow chart in FIG. 8.

Figure 8B:
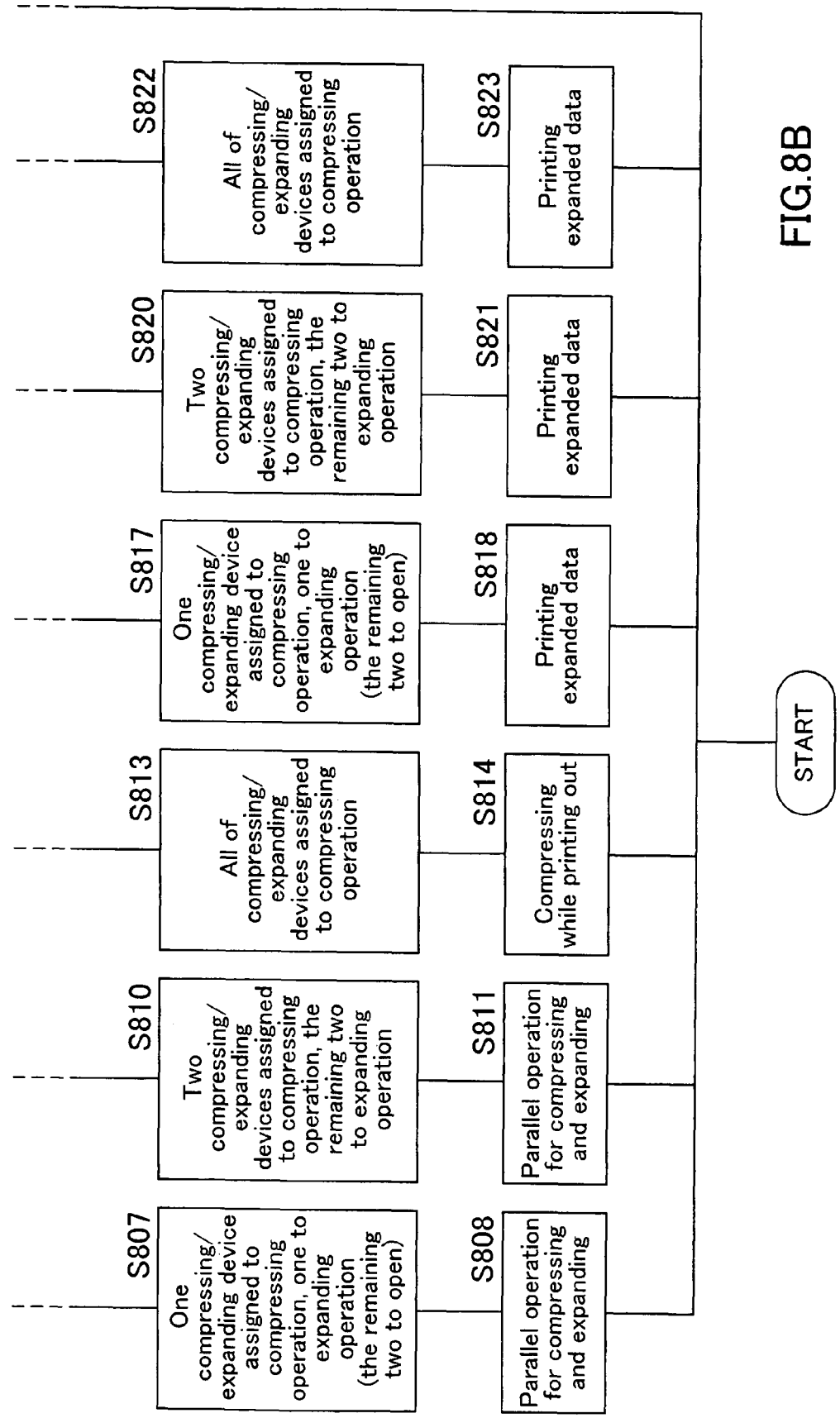
FIG. 8 is a flowchart showing the operation of the data processing apparatus shown in FIG. 7.

In FIG. 8, at S801, the CPU 9 of the MFP1 discriminates whether an output instruction of the image data is made. If no instruction is made (No at S801), the routine stays as it is. If the instruction is made (Yes at S801), at S802, it is discriminated whether the printing operation is the first set of printing operation.

At S802, if it is the first set of printing operation (Yes at S802), at S803, the RGB input portion 21 of the original reading portion 2 reads the original. The read image data is color-converted by the YMCK converting portion 22, and binarized in cases where the binarizing portion 24 is provided, and thereafter transferred to the working memory 5 by the transfer controlling portion 81 and stored in the working memory 5.

Then, at S804, the CPU 9 discriminates whether the output mode is a print mode. If the output mode is a print mode (Yes at S804), at S805, the color/monochrome data discrimination portion 11 discriminates whether the image data stored image data is color data or monochrome data, and the discrimination result is notified to the compressing/expanding controlling portion 7.

If the image data is monochrome data (Yes at S805), at S806, the binarized/multi-valued data discrimination portion 12 discriminates whether the image data is binarized data or multi-valued data, and the result is notified to the compressing/expanding controlling portion 7. If the image data is binarized data (Yes at S806), at S807, the compressing/expanding controlling portion 7 assigns one compressing/expanding device 71 to compressing operation, the other one compressing/expanding device 72 to expanding operation among four compressing/expanding devices 71 to 74. The remaining two compressing/expanding device 73 and 74 are kept free for the next job. Subsequently, at S808, the transfer controlling portion 81 transfers the monochrome binarized data per divided block in the sub-scanning direction from the working memory 5 to the compressing/expanding device 71 to be compressed and then to the file memory 6 to be stored for the second set of printing operation. Further, the transfer controlling portion 81 transfers the data read out from the file memory 6 to the compressing/expanding device 72 to be expanded. In short, compressing operation and expanding operation are executed in parallel. The expanded data is transferred to the printer portion 3 via the working memory 5 and then printed by the printer portion 3. Then, the routine returns to S801. The aforementioned operations are repeated by the number of pages transmitted.

At S806, if the monochrome data is not binary data (No at S806), the routine proceeds to S810.

At S805, if the image data is color data (No at S805), the routine proceeds to S809 to discriminate whether the color data is binary data. If the color data is binary data (Yes at S809), at S810, the compressing/expanding controlling portion 7 assigns two compressing/expanding devices 71 and 72 to compressing operation and the remaining two compressing/expanding devices 73 and 74 to expanding operation among four compressing/expanding devices 71 to 74. In other words, in cases where the image data is monochrome multi-valued data and in cases where the image data is color binary data, two compressing/expanding devices are assigned to compressing operation and expanding operation, respectively.

Subsequently, at S811, the transfer controlling portion 81 transfers the monochrome multi-valued data or the color binary data from the working memory 5 to the compressing/expanding devices 71 and 72 to be compressed, then to the file memory 6 to be stored. Furthermore, the transfer controlling portion 81 transfers the data read out from the file memory transfers to the compressing/expanding devices 73 and 74. That is, the compressing operation and the expanding operation of the data are executed in parallel. The expanded data is transferred to the printer portion 3 via the working memory 5 and then printed by the printer portion 3. Then, the routine proceeds to S801.

At S809, if the color data is multi-valued data (No at S809), at S813, the compressing/expanding controlling portion 7 assigns all of the four compressing/expanding devices 71 to 74 to compressing operation.

Subsequently, at S814, the transfer controlling portion 81 transfers the color multi-valued data from the working memory 5 to the compressing/expanding devices 71 to 74 and also to the printer portion 3 simultaneously. Thus, the color multi-valued data is compressed while being printed. The compressed image data is stored in the file memory 6 for the second set of printing operation.

At S804, if the output mode is not a print mode by the printer portion 3, at S812, it is discriminated whether the image data is monochrome data or color data. If it is monochrome data (Yes at S812), the routine proceeds to S807 mentioned above. If it is color data (No at S812), the routine proceeds to S810 mentioned above.

At S802, if the printing operation is not the first set of printing operation (No at S802), it is discriminated whether the image data is monochrome data. It is it monochrome data (Yes at S815), at S816, it is discriminated whether the data is binary data.

If the data is not binary data (No at S816), the routine proceeds to S820. If the data is binary data (Yes at S816), since the data is monochrome binary data, at S817, in the same manner as in the first set of processing (S807), the compressing/expanding controlling portion 7 assigns one compressing/expanding device 71 to compressing operation and the other one compressing/expanding device 72 to expanding operation among four compressing/expanding devices 71 to 74, and the remaining compressing/expanding devices 73 and 74 are kept free. Subsequently, at S818, the transfer controlling portion 81 transfers the data read out from the file memory 6 to the compressing/expanding device 72 assigned to expanding operation to be expanded, and thereafter to the printer portion 3 via the working memory 5 for printing. This operation is repeated by the number of all pages.

Furthermore, at S815, if the image data is color data (No at S815), at S819, it is discriminated whether the data is binary data. If the data is binary data (Yes at S819), the routine proceeds to S820. If the data is not binary data, the routine proceeds to S822.

At S820, since the data is monochrome multi-valued data or color binary data, in the same manner as in the first set of processing (S810), the compressing/expanding controlling portion 7 assigns two compressing/expanding devices 71 and 72 to compressing operation and the remaining two compressing/expanding devices 71 and 72 to expanding operation among four compressing/expanding devices 71 to 74. Subsequently, at S821, the transfer controlling portion 81 transfers the data read out from the file memory 6 to the compressing/expanding devices 73 and 74 assigned to expanding operation to be expanded, thereafter to the printer portion 3 via the working memory 5 for printing. This operation is repeated by the number of all pages.

At S822, since the data is color multi-valued data, in the same manner as in the first set of processing (S813), the compressing/expanding controlling portion 7 assigns all of the four compressing/expanding devices 71 to 74 to compressing operation. Subsequently, at S823, the transfer controlling portion 81 transfers the data read out from the file memory 6 to the all of the compressing/expanding devices 71 to 74 assigned to expanding operation to be expanded, thereafter to the printer portion 3 via the working memory 5 for printing. This operation is repeated by the number of all pages.

As will be understood from the above explanation referring to FIG. 8, since the data which is monochrome data and binary data includes least amount of information, the data is transferred to the printer portion 3 for executing the first set of printing operation while being transferred through two compressing/expanding devices 71 and 72 operating in parallel, one assigned to expanding operation and the other assigned to expanding operation. Accordingly, since the compressing operation by the compressing/expanding device 71 is not required to be synchronized with the expanding operation by the compressing/expanding device 72, the reading operation speed of the original reading portion 2 can be arbitrarily set irrespective of the expanding operation by the compressing/expanding device 72. As a result, the reading operation speed of the original reading portion 2 can be maximized.

Furthermore, since the data which is monochrome data and multi-valued data or color data and binary data includes secondary small amount of information, two compressing/expanding devices 71 and 72 are assigned to compressing operation and two compressing/expanding devices 73 and 74 are assigned to expanding operation, and the data is transferred to the printer portion 3 via the compressing/expanding devices 71 and 72, 73 and 74 operating in parallel for the first set of printing operation. In this case, the compressing operation by the compressing/expanding device 71, 72 is also not required to be synchronized with the expanding operation by the compressing/expanding device 73, 74, the reading operation speed of the original reading portion 2 can be arbitrarily set irrespective of the expanding operation by the compressing/expanding device 72. As a result, the reading operation speed of the original reading portion 2 can be maximized.

Further, if the data is color and multi-valued data, since the data includes a large amount of information, the data is transferred to all of the compressing/expanding devices 71 to 74 assigned to compressing operation to be compressed while being transferred to the printer portion 3. This enables quick initiation of printing processing.

In cases where the data-to-be-outputted is print data transmitted from outside, the procedures shown in FIG. 8 will be applied.

Although one embodiment of the present invention is explained above, the present invention is not limited to the above embodiment. For example, in cases where data-to-be-outputted is color data, in the aforementioned embodiment, all of the compressing/expanding devices are assigned to compressing operation or expanding operation. However, it is not always to assign all of the compressing/expanding devices.

Furthermore, in the present invention, the number of compressing/expanding devices is not limited to four, but may be two, three, or five or more.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A data processing apparatus, comprising:
   an input portion which accepts input of a print job including image data;
   a print portion which prints the image data to a recording medium;
   a plurality of compressing/expanding devices which compress image data and expand compressed image data;
   a file memory which stores said compressed image data compressed by the compressing/expanding device;
   a discrimination portion which discriminates whether the print job is a print job which makes plural prints of the image data or a single print of the image data;
   a color/monochrome discrimination portion which discriminates whether the image data is color data or monochrome data; and
   a compressing/expanding controller which selects one of a first mode, a second mode, and a third mode, wherein
   a) in the first mode, a part of the plurality of compressing/expanding devices is allotted to compression operation for compressing the image data and the other part or remaining compressing/expanding devices are allotted to expansion operation for expanding the image data, and the compression operation and the expansion operation are operated in parallel,
   b) in the second mode, all of the plurality of compressing/expanding devices are allotted to compression operation for compressing the image data, and
   c) in the third mode, all of the plurality of compressing/expanding devices are allotted to expansion operation for expanding the image data,
   wherein in cases where it is discriminated by the discrimination portion that the print job is a print job which makes plural prints of the image data and the color/monochrome discrimination portion discriminates that the image data is monochrome data,
   the plurality of compressing/expanding devices are operated in the first mode, and
   the monochrome data is transferred to the part of the compressing/expanding devices for compression operation as monochrome data for a first print, second and subsequent prints, and
   wherein in cases where it is discriminated by the discrimination portion that the print job is a print job which makes plural prints of the image data and it is discriminated by the color/monochrome discrimination portion that the image data is color data,
   the plurality of compressing/expanding devices are operated in the second mode, and
   the color data is transferred without compression or expansion to the print portion as color data for a first print, and
   concurrently the color data is transferred to all of the compression operation compressing/expanding devices as color data for second and subsequent prints, and wherein in cases where it is discriminated by the discrimination portion that the print job is a print job that makes plural prints of the image data, and it is discriminated by the color/monochrome discrimination portion that the image data is color data, the color data transferred to all of the compressing/expanding devices as color data for second and subsequent prints is compressed by all of the compressing/expanding devices and stored in the file memory, and thereafter the plurality of compressing/expanding devices are operated in the third mode, the compressed color data stored in the file memory is transferred to all of the compressing/expanding devices and expanded, and the expanded color data is transferred to the print portion to be printed.

2. The data processing apparatus as recited in claim 1, wherein in cases where the plurality of compressing/expanding devices are operated in the first mode, depending on information amount of the monochrome data, the number of compressing/expanding devices to be allotted to compression operation and the number of compressing/expanding devices to be allotted to expansion operation are changed.

3. The data processing apparatus as recited in claim 1, wherein the monochrome data transferred to the part of compressing/expanding devices as monochrome data for the first print, second and subsequent prints is compressed by the part of compressing/expanding devices and stored in the file memory, thereafter the compressed monochrome data stored in the file memory is transferred to the other part or remaining compressing/expanding devices and expanded, and the expanded monochrome data is transferred to the print portion to be printed.

4. An image forming apparatus, comprising:
   the data processing apparatus of claim 1.

5. An image forming apparatus, comprising: the data processing apparatus of claim 2.

6. An image forming apparatus, comprising: the data processing apparatus of claim 3.

* * * * *